United States Patent
Boddhireddy et al.

(10) Patent No.: US 10,929,862 B2
(45) Date of Patent: Feb. 23, 2021

(54) TELECOMMUNICATION NETWORK CONFIGURATION FROM FEATURE-BASED EXTRAPOLATION

(71) Applicant: AT&T Intellectual Property I, L.P., Atlanta, GA (US)

(72) Inventors: Prashanth Boddhireddy, Plano, TX (US); Kyubyul Hwang, Plano, TX (US); Siva Kolachina, Plano, TX (US); Vijayendra Kousik Garikapati, Los Angeles, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 167 days.

(21) Appl. No.: 16/179,799

(22) Filed: Nov. 2, 2018

(65) Prior Publication Data
US 2020/0143398 A1    May 7, 2020

(51) Int. Cl.
G06Q 30/02    (2012.01)
H04H 60/46    (2008.01)
(Continued)

(52) U.S. Cl.
CPC ......... *G06Q 30/0204* (2013.01); *H04H 60/37* (2013.01); *H04H 60/45* (2013.01); *H04H 60/46* (2013.01)

(58) Field of Classification Search
CPC combination set(s) only.
See application file for complete search history.

(56) References Cited

U.S. PATENT DOCUMENTS

| 6,594,699 | B1 | 7/2003 | Sahai et al. |
| 7,383,243 | B2 * | 6/2008 | Conkwright ........... G06Q 30/02 705/14.41 |

(Continued)

FOREIGN PATENT DOCUMENTS

CA    2474879 A1    1/2003

OTHER PUBLICATIONS

"Harnessing Subscriber Cetric Optimmization for the Next Generation of Self-Organizing Networks." Viavi Solutions, viavisolutions.com, 2015. https://www.viasolutions.com/en-us/literature/harnessing-subs criber-centricoptimization-next-generation-self-organizing-networks-white-paper-en.pdf.
(Continued)

*Primary Examiner* — Jamie H Austin

(57) ABSTRACT

A processing system may obtain a feature set for segmenting households comprising subscribers of a telecommunication network into segments, the households including reporting households for which an information value regarding a feature of interest is available, and non-reporting households for which an information value regarding the feature of interest is not available. The processing system may then assign the households to segments, each segment associated with a set of information values for features of the feature set, and where for each segment, households assigned to the segment have information values that are the same for each of the features of the feature set. The processing system may also link each non-reporting household in a segment to a reporting household in the segment. The processing system may then reconfigure the telecommunication network in accordance with information values for the at least one feature of interest for the plurality of households.

20 Claims, 7 Drawing Sheets

(51) Int. Cl.
*H04H 60/45* (2008.01)
*H04H 60/37* (2008.01)

(56) References Cited

U.S. PATENT DOCUMENTS

| | | | |
|---|---|---|---|
| 7,500,258 B1 | 3/2009 | Eldering | |
| 7,636,793 B1 | 12/2009 | Friedman | |
| 7,643,434 B2 | 1/2010 | Mandavilli et al. | |
| 8,082,335 B2 | 12/2011 | Mishra | |
| 8,364,678 B2 | 1/2013 | Miller et al. | |
| 8,510,658 B2 | 8/2013 | Priyadarshan et al. | |
| 8,613,009 B2 | 12/2013 | Savoor et al. | |
| 8,661,104 B2 | 2/2014 | Finkelstein et al. | |
| 8,701,138 B2 | 4/2014 | Stern et al. | |
| 8,984,547 B2 | 3/2015 | Lambert et al. | |
| 9,049,346 B2 * | 6/2015 | Hasek | H04N 21/47202 |
| 9,098,349 B2 | 8/2015 | Gerovac et al. | |
| 9,300,542 B2 | 3/2016 | Gonzalez et al. | |
| 9,516,119 B2 | 12/2016 | Bultema et al. | |
| 9,519,728 B2 | 12/2016 | Rieger et al. | |
| 9,848,224 B2 | 12/2017 | Sullivan et al. | |
| 9,866,901 B1 | 1/2018 | Pecjak et al. | |
| 9,961,383 B2 | 5/2018 | Hasek | |
| 9,967,364 B2 * | 5/2018 | Fix | H04W 16/18 |
| 10,027,554 B2 | 7/2018 | Mishra et al. | |
| 2002/0131374 A1 | 9/2002 | Lee | |
| 2005/0060425 A1 | 3/2005 | Yeh et al. | |
| 2008/0059288 A1 * | 3/2008 | Kokernak | G06Q 30/0201 705/14.41 |
| 2013/0179223 A1 | 7/2013 | Mohan et al. | |
| 2014/0059579 A1 * | 2/2014 | Vinson | H04N 21/25833 725/14 |
| 2018/0014082 A1 * | 1/2018 | Daily | H04L 65/4076 |
| 2018/0121942 A1 | 5/2018 | Vlassis et al. | |
| 2019/0116392 A1 * | 4/2019 | Vinson | H04H 60/52 |
| 2019/0182734 A1 * | 6/2019 | Laliberte | H04W 24/08 |

OTHER PUBLICATIONS

Hendry, Andrew, "Intelligent Traffic Management with the F5 BIG-IP Platform," F5 Networks, Inc., f5.com, 2012. https://www.f5.com/pdf/white-pa pers/intellient-traffic-management-whitepaper.pdf.

"Netwok & Service Monitoring Suite," Argela, argela.com, Apr. 9, 2016. https://web.archive.org/web/20160409214215/http://www.argela.com.tr.80/network-subscriber-analytics/.

* cited by examiner

| Household ID | Household type | DMA | Gender | Views in hrs |
|---|---|---|---|---|
| 1 | R_HH | 101 | m | 20 hrs |
| 2 | R_HH | 101 | m | 10 hrs |
| 3 | NR_HH | 101 | m | ? |
| 4 | NR_HH | 101 | m | ? |
| 5 | R_HH | 101 | f | 200 hrs |
| 6 | R_HH | 101 | f | 500 hrs |
| 7 | NR_HH | 101 | f | ? |
| 8 | NR_HH | 101 | f | ? |
| 9 | NR_HH | 101 | f | ? |
| 10 | R_HH | 102 | m | 50 hrs |
| 11 | R_HH | 102 | m | 60 hrs |
| 12 | NR_HH | 102 | m | ? |

Rows 1–4: Segment 1; Rows 5–9: Segment 2; Rows 10–12: Segment 3

| Initial (Level 1) features |
|---|
| DMA Code |
| Subscription package |
| Age |
| Gender |
| State |
| Number of children |
| Number of adults |
| Spoken language |
| Phone service |
| Access indicator |
| Tenure In Months |

301

| Level 2 features |
|---|
| DMA Code |
| Subscription package |
| Age |
| Gender |
| State |
| Number of children |
| Number of adults |
| Tenure In Months |

302

| Default (Level 3) features |
|---|
| DMA Code |
| Subscription package |
| Age |
| Gender |

TELECOMMUNICATION NETWORK CONFIGURATION FROM FEATURE-BASED EXTRAPOLATION

The present disclosure relates generally to telecommunication network optimization, and more particularly to devices, computer-readable media, and methods for configuring a telecommunication network via feature-based segmentation and linking of non-reporting and reporting subscriber households.

BACKGROUND

Information on household television consumption is desired by various parties for various purposes. However, there are households for which television consumption information is not collected, either because a service provider is technically or practically incapable of collecting such information (e.g., for households with older set-top boxes that do not communicate back to the network) or because a household has opted-out of such information collection and/or recordation. Legal or regulatory requirements in some jurisdictions may also prevent a service provider from collecting and/or recording such television consumption information. Aggregate television consumption information for a universe of households (e.g., subscriber households) may therefore be inferred through the process of extrapolation. For example, with a linear scaling approach, television consumption for a universe of households is calculated from mean television consumption data for households for which television consumption information is available (broadly "reporting households") multiplied by the total number of households. The solution assumes that viewership behavior of reporting households represents those of the non-reporting households (e.g., households for which television consumption information is not available). However, this assumption may be incorrect. In a similar approach, aggregate television consumption information is calculated using linear scaling on clusters. For instance, households may be clustered based on demographic features using k-means clustering or other clustering techniques. The television consumption information is then calculated for each cluster through scaling. For example, the mean television consumption information of reporting households, times the total number of households in a cluster is taken as the aggregate television consumption information for the cluster. The television consumption information of the universe of households is then the sum of television consumption data of all the clusters. However because of the clustering approach, the importance of features is lost. For instance, it is not apparent which features contributed more to a cluster and if these features are persistent across all households.

SUMMARY

In one example, the present disclosure provides a method, computer-readable medium, and apparatus for configuring a telecommunication network via feature-based segmentation and linking of non-reporting and reporting subscriber households. For example, a processing system including at least one processor may obtain a feature set for segmenting a plurality of households comprising subscribers of a telecommunication network into a plurality of segments. In one example, the plurality of households includes a plurality of reporting households and a plurality of non-reporting households, where the plurality of reporting households includes households of the plurality of households for which an information value regarding at least one feature of interest is available to the processing system, and where the plurality of non-reporting households includes households of the plurality of households for which an information value regarding the at least one feature of interest is not available to the processing system. The processing system may further assign households of the plurality of households to segments of the plurality of segments, where each segment is associated with a set of information values for features of the feature set, and where for each segment, households assigned to a respective segment have information values that are the same for each of the features of the feature set. The processing system may also link each non-reporting household of the plurality of non-reporting households in a segment to a reporting household in the segment, wherein the linking comprises, for each non-reporting household in the segment: selecting the reporting household in the segment to be linked to the non-reporting household, the reporting household is then made unavailable for selection to link to another non-reporting household in the segment until all reporting households in the segment have been selected to link to a respective non-reporting household in the segment; and assigning an information value for the at least one feature of interest from the reporting household to the non-reporting household. The processing system may then reconfigure the telecommunication network in accordance with information values for the at least one feature of interest for the plurality of households.

BRIEF DESCRIPTION OF THE DRAWINGS

The present disclosure can be readily understood by considering the following detailed description in conjunction with the accompanying drawings, in which:

FIG. 2 illustrates an example table of household records comprising information values for different features that may be available, in accordance with the present disclosure;

FIG. 3 illustrates an example set of features which conceptually denotes a priority or ordering of features for use in segmenting households, in accordance with the present disclosure;

To facilitate understanding, identical reference numerals have been used, where possible, to designate identical elements that are common to the figures.

DETAILED DESCRIPTION

Figure 1:
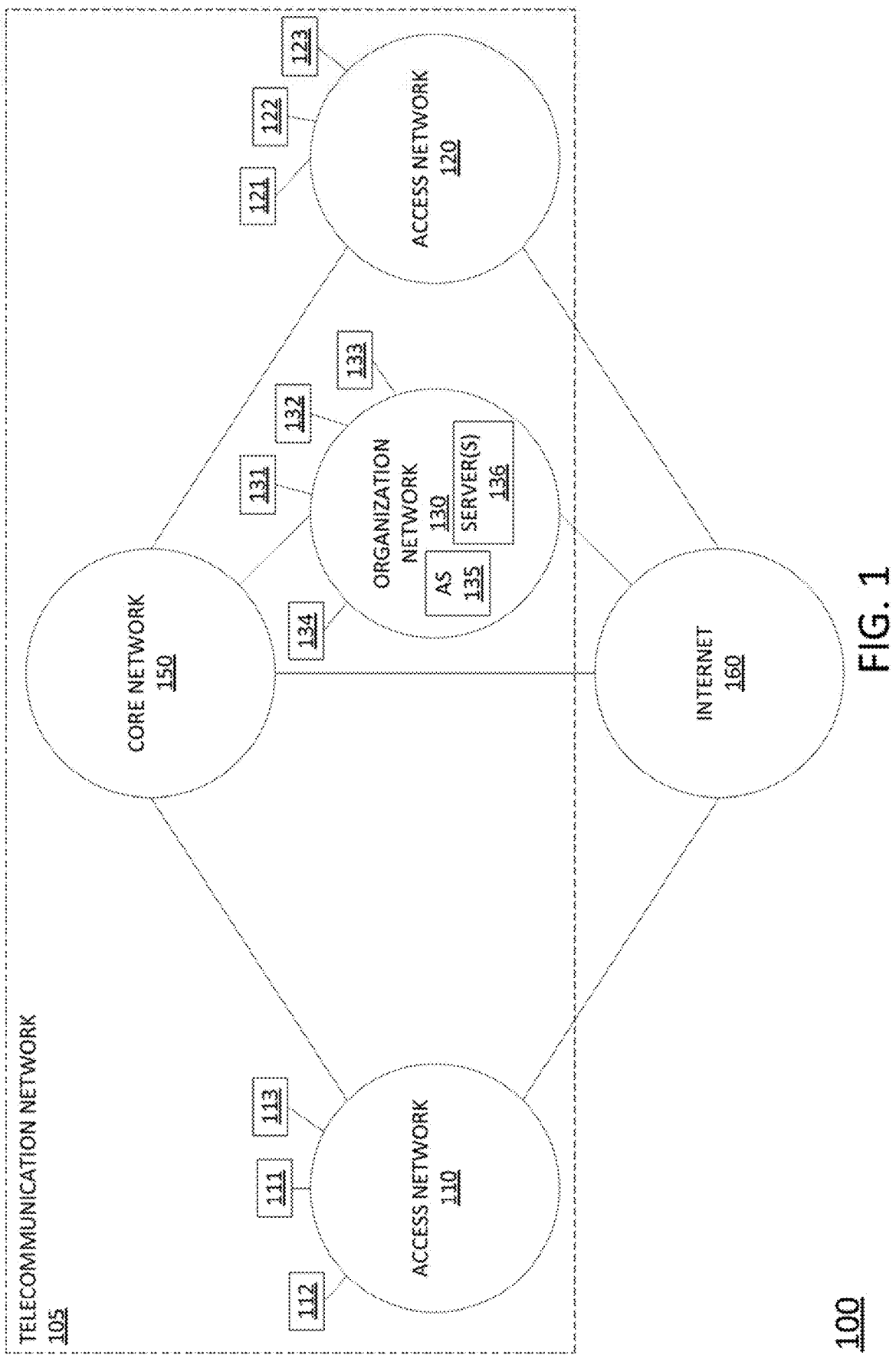
FIG. 1 illustrates one example of a system including a telecommunication network, according to the present disclosure.

The present disclosure broadly discloses methods, non-transitory (i.e., tangible or physical) computer-readable media, and apparatuses for configuring a telecommunication network via feature-based segmentation and linking of non-reporting and reporting subscriber households. In particular, the present disclosure describes an extrapolation method which may be referred to as sampling with features. In one example, "features" (such as demographics, subscription package, tenureship, etc.) are gathered for an entire universe of households and segments are created, where each segment contains households that have the same information values for each of the features that are used to differentiate the segments. Each segment may comprise reporting households and non-reporting households. In one example, each non-reporting household is linked to a reporting household by random sampling without replacement from the pool of reporting households in the segment. If there are more non-reporting households than reporting households, then the sampling without replacement process starts again until all non-reporting households have been linked to a reporting household. In situations where a segment does not contain a reporting household, the segment may be re-constructed based upon fewer features (layered segmentation) until at least one reporting household (or a minimum/threshold number of reporting households) is included in the segment. Then, each non-reporting household in the segment may be linked to a reporting household in the segment as described above. Thus, non-reporting households are linked to reporting households through iterative cyclic sampling without replacement. In addition, segments are constructed iteratively with fewer features until each segment contains both reporting households and non-reporting households so as to enable linking of non-reporting households to reporting households. Subsequently, television consumption information (or other metrics) of a reporting household may be extrapolated to any non-reporting household that is linked to the reporting household. In addition, aggregate television consumption information (or other aggregate metrics) for a population that includes reporting and non-reporting households may be calculated after the extrapolation.

Since the television consumption information (or other information values) of linked households are assumed equal, this helps to retain variances across households. In particular, examples of the present disclosure iteratively construct segments with fewer features when a minimum number of reporting households is not available with all the features, while the random sampling approach retains variability within each segment. In addition, the defining information values for a segment are clearly known because these information values for particular features are used for segmentation. Thus, features can be restricted to those understood to be important within the domain. In contrast, in clustering approaches, households may be clustered (and are therefore assumed to be similar) using a distance measure based upon a variety of features that may be relatively unimportant for a current task or purpose.

Examples of the present disclosure apply to television viewership as well as a variety of other domains where information is only known for a subset of a population and where it is desired to extrapolate for the entire population. For instance, examples of the present disclosure may apply to segmenting telecommunication network subscriber households based upon demographic features, television service features, telephone service features, and/or data or Internet service features, linking non-reporting households to reporting households, and then inferring certain Internet data usage, phone call usage, television consumption, and so forth for the entire universe of households or for subsets of households based upon any number of features, such as geographic areas, zip codes, subscription levels, types of service, and so forth. These and other aspects of the present disclosure are discussed in greater detail below in connection with the examples of FIGS. 1-7. It should be noted that any reference made in the present disclosure as to the term "reporting household" and "non-reporting household" can be correlated or extended to the physical endpoint devices used by subscribers of these households. In other words, the extrapolation as further discussed below can be perceived as extrapolating a consumption of device A based on its link to device B as an example.

To aid in understanding the present disclosure, FIG. 1 illustrates an example system 100 comprising a plurality of different networks for supporting the configuring of a telecommunication network via feature-based segmentation and linking of non-reporting and reporting subscriber households, in accordance with the present disclosure. Telecommunication network 105 may comprise a core network 150 with components for telephone services, Internet or data services, and/or television services (e.g., triple-play services, etc.) that are provided to customers (broadly "subscribers"), and to peer networks. In one example, core network 150 may combine core network components of a cellular network with components of a triple-play service network. For example, core network 150 may functionally comprise a fixed mobile convergence (FMC) network, e.g., an IP Multimedia Subsystem (IMS) network. In addition, core network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 150 may also further comprise a broadcast television network, e.g., a traditional cable provider network or an Internet Protocol Television (IPTV) network, as well as an Internet Service Provider (ISP) network. With respect to television service provider functions, core network 150 may include one or more television servers for the delivery of television content, e.g., a broadcast server, a cable head-end, a video-on-demand (VoD) server, and so forth. For example, core network 150 may comprise a video super hub office, a video hub office and/or a service office/central office. For ease of illustration, various components of core network 150 are omitted from FIG. 1.

In one example, access networks 110 and 120 may each comprise a Digital Subscriber Line (DSL) network, a broadband cable access network, or the like. For example, access networks 110 and 120 may transmit and receive communications between endpoint devices 111-113, 121-123, and core network 150 relating to voice telephone calls, communications with web servers via the Internet 160, organization network 130, and so forth. Access networks 110 and 120 may also transmit and receive communications between endpoint devices 111-113, 121-123 and other networks and devices via Internet 160. Endpoint devices 111-113 and 121-123 may each comprise a telephone, e.g., for analog or digital telephony, a mobile device, a cellular smart phone, a laptop, a tablet computer, a desktop computer, a plurality or cluster of such devices, and the like. In some examples, endpoint devices 111-113 and 121-123 may connect to access networks 110 and 120 via one or more intermediate devices, such as a gateway and router, an Internet Protocol private branch exchange (IPPBX), and so forth. In one example, the access networks 110 and 120 may be different types of access networks. In another example, the access networks 110 and 120 may be the same type of access network. In one example, one or more of the access networks 110 and 120 may be operated by the same service provider operating core network 150.

In one example, access networks 110 and 120 may include a plurality of distribution areas (DAs). The distribution areas may include portions of access networks 110 and 120 associated with individual nodes (e.g., fiber optic nodes and/or digital subscriber line access multiplexers (DSLAMs)) and may serve multiple living units (LUs). The living units may include single family homes and businesses, as well as multi-dwelling units (MDUs). The distribution areas may be further associated with different wire centers and/or central offices (COs) of the telecommunication network 105 and/or access networks 110 and 120. Each distribution area may be a portion of the telecommunication network 105 with fiber to the node (FTTN) or fiber to the curb (FTTC) already deployed (e.g., a hybrid fiber-coaxial (HFC) access network portion), or may comprise regions of the telecommunication network 105 with electrically wired trunks/routes from central offices to nodes (e.g., a DSL access network portion, etc.). In addition, distribution areas may be associated with either overhead utility wiring (aerial) or buried utility wiring (buried).

In one example, an organization network 130 may comprise a local area network (LAN), or a distributed network connected through permanent virtual circuits (PVCs), virtual private networks (VPNs), and the like for providing data and voice communications. In one example, the organization network 130 links one or more endpoint devices 131-134 with each other and with Internet 160, core network 150, devices accessible via such other networks, such as endpoint devices 111-113 and 121-123, and so forth. In one example, endpoint devices 131-134 may each comprise a telephone for analog or digital telephony, a mobile device, a cellular smart phone, a laptop, a tablet computer, a desktop computer, a bank or cluster of such devices, and the like. In one example, the organization network 130 may be associated with the telecommunication network 105. For example, the organization may comprise the telecommunication network service provider, where endpoint devices 131-134 of the organization network 130 may comprise devices of organizational agents, such as customer service agents, marketing personnel, or other employees or representatives who are tasked with addressing customer-facing issues and/or personnel for network maintenance, network repair, construction planning, and so forth.

In one example, the system 100 may also include one or more servers 136 in the organization network 130. In one example, the servers 136 may each comprise a computing system, such as computing system 700 depicted in FIG. 7, and may be configured to host one or more centralized system components. It should be noted that in one example, a centralized system component may be hosted on a single server, while in another example, a centralized system component may be hosted on multiple servers, e.g., in a distributed manner. For example, a first centralized system component may comprise a database of customer/subscriber-assigned telephone numbers, while a second centralized system component may comprise a database of customer account data for all or a portion of the customers/subscribers of the telecommunication network 105. Other centralized system components may include a billing system, a customer relationship management (CRM) system, a trouble ticket system, an inventory system (IS), an ordering system, an enterprise reporting system (ERS), an account object (AO) database system, and so forth.

Any one or more of such centralized system components may generate, collect and/or store customer demographic information comprising, for example: a number of household members, age(s), gender(s), subscription plan(s), television viewing preferences, a service address, device type (s), such as a smartphone model, a television model, a home computer model, a set top box model, a router model, and so forth, a billing history, a payment history, purchasing and ordering information, payment methods, employment information, salary information, and so forth. The customer demographic information may be based upon a customer's interactions with the telecommunication network 105. In one example, the customer demographic information may also include information obtained by the telecommunication network 105 from third parties, such as merchants, credit card companies, credit bureaus, and the like. In one example, servers 136 may also include a marketing automation platform (MAP) for sending automated communications, e.g., automated phone calls, text messages, emails, and so forth, to endpoint devices 111-113 and 121-123, as well as other customer/subscriber devices, and/or for providing instructions, communication templates, or the like to marketing personnel to communicate with endpoint devices 111-113 and 121-123, as well as other customer/subscriber devices.

Figure 7:
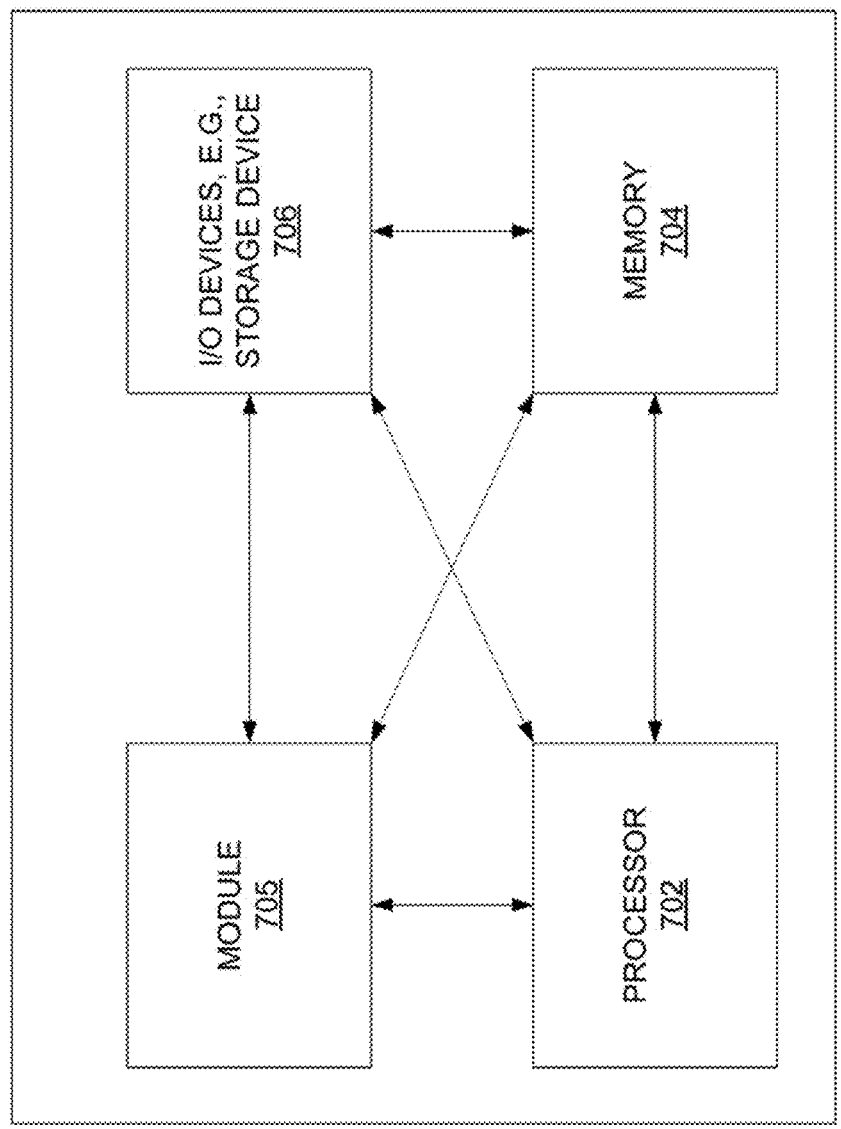
FIG. 7 illustrates a high-level block diagram of a computing device specially programmed to perform the functions described herein.

In one example, organization network 130 may also include an application server (AS) 135. In one example, AS 135 may comprise a computing system, such as computing system 700 depicted in FIG. 7, and may be configured to provide one or more functions for configuring a telecommunication network via feature-based segmentation and linking of non-reporting and reporting subscriber households, in accordance with the present disclosure. For example, AS 135 may be configured to perform one or more steps, functions, or operations in connection with the example method 600 described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 7 and discussed below) or multiple computing devices collectively configured to perform various steps, functions, and/or operations in accordance with the present disclosure.

In one example, application server 135 may obtain a feature set for segmenting a plurality of households comprising subscribers of telecommunication network 105 into a plurality of segments. For instance the endpoint devices 111-113 and 121-123 may be associated with subscribers/households of telecommunication network 105. The plurality of households may include reporting households (e.g., associated with endpoint devices 111, 113, and 122) and a plurality of non-reporting households (e.g., associated with endpoint devices 112, 121, and 123), where the reporting/non-reporting is with respect to at least one feature of interest. In one example, the feature set, as obtained, may include an indication of an order of priority of the features to be used for segmentation. For instance, the feature set may be provided by a client device or system, e.g., by a network technician or other personnel via one of the endpoint devices 131-134. In addition, in one example, an indication of at least one feature of interest may also be obtained at the same time or in connection with the feature set. For example, the application server 135 may be instructed to assign subscriber households to segments according to the feature set for purposes of inferring a metric of the at least one feature of interest to then be used to reconfigure the telecommunication network.

Accordingly, the application server 135 may assign the households to segments such that for each segment, households assigned to the segment have information values that are the same for each of the features of the feature set. If there is not at least one reporting household in a particular segment (or at least a minimum number or percentage of reporting households in the segment), the application server 135 may remove information values for a number of features of the feature set until at least one reporting household is in the segment. For instance, application server 135 may remove the information values for the number of features according to the order of priority. In addition, in one example, the application server 135 may remove the information values for the number of features in stages comprising one or more of the information values per stage. In such an example, the application server 135 may stop at a stage when at least one reporting household, or a minimum number or percentage of reporting households, is/are in the segment.

The application server 135 may then, for each segment, link each non-reporting household in the segment to a reporting household in the segment, e.g., iteratively without replacement, until all reporting households in the segment have been selected. For instance, when a reporting household is linked to a non-reporting household, the reporting household is made unavailable for selection to link to another non-reporting household in the segment until all reporting households in the segment have been selected to link to a respective non-reporting household in the segment. All of the reporting households may then be made available again if there are additional non-reporting households that still need to be linked to a reporting household. Thus, a reporting household may be linked to zero, one, or more than one non-reporting household. The application server 135 may also assign information values for the feature of interest from reporting households to the respective linked non-reporting households.

The application server 135 may then reconfigure the telecommunication network 105 in accordance with information values for the at least one feature of interest for the plurality of households. For instance, application server 135 may identify a utilization trend in the telecommunication network 105 comprising an increased usage or a decreased usage of at least one service provided by the telecommunication network 105, and allocate at least one additional resource of the telecommunication network 105 to the at least one service or remove at least one existing resource of the telecommunication network 105 that is allocated to the at least one service in accordance with the utilization trend. The resources of the telecommunication network 105 that may be allocated and deallocated may include hardware computing resources, or non-hardware resources provided via at least one hardware computing resource. For instance, hardware computing resource can be content servers, switches, routers, fiber or non-fiber links, remote radio heads (RRHs) baseband units (BBUs), picocells, femtocells, and so forth (not shown) in telecommunication network 105 that are controllable by application server 135 to be active or inactive, to operate with particular configurations or settings, and so on. As just one example, when the service comprises a television service, and when the utilization trend comprises an increased viewership of a video program beyond a threshold viewership within a particular geographic area and/or a particular portion of the telecommunication network 105, the at least one additional resource that is allocated to the service may comprise storage capacity for at least one additional copy of the video program at an edge server (not shown) of the telecommunication network 105.

In addition, in one example, application server 135 may perform automated communication actions in accordance with the information values for at least one feature of interest. For instance, application server 135 may send instructions to one of the servers 136 comprising a marketing automation platform, e.g., to send automated marketing communications to one or more of endpoint devices 111-113 and 121-123, or to other devices of subscriber households associated with endpoint devices 111-113 and 121-123. In one example, the instructions may include differentiated communications for customers/subscribers of different segments, e.g., if more than a threshold number of households in the segment include a particular information value for the at least one feature of interest. Alternatively, or in addition, the households may be grouped in other ways for automated communication actions (e.g., in sets/groups that are not the same as the segments used to link non-reporting households to reporting households).

In one example, application server 135 may update information values for non-reporting households as corresponding information values for linked reporting households are detected to be changed. In other words, in one example, the linking may persist beyond the initial linkage and assigning of information values from reporting households to non-reporting households for the one or more features of interest. In addition, application server 135 may also calculate and/or recalculate segments for different tasks, for different feature sets having different priorities/orders of features, for different features of interest, and so on. These and other example operations for configuring of a telecommunication network via feature-based segmentation and linking of non-reporting and reporting subscriber households are described in greater detail below in connection with the examples of FIGS. 2-6. In addition, it should be realized that the system 100 may be implemented in a different form than that illustrated in FIG. 1, or may be expanded by including additional endpoint devices, access networks, network elements, application servers, etc. without altering the scope of the present disclosure.

FIG. 2 illustrates a table 200 of household records comprising information values for different features that may be available in accordance with the present disclosure. For instance, the table 200 identifies whether a household is a reporting household or a non-reporting household, identifies a designated marketing area (DMA) for each household, a gender for a head of household, and a number of viewing hours. In the present example, the number of viewing hours may be a "feature of interest" since data (broadly, an "information value") is available with respect to this feature for the reporting households (R_HH), but is not available with respect to this feature for the non-reporting households (NR_HH). In accordance with the present disclosure, a segment is created for households with identical feature values (e.g., for features which are designated as part of a feature set for segmentation). In this scenario, DMA and Gender values are identical within each segment. For instance, segment 1 includes households 1 and 2 (reporting households) as well as households 3 and 4 (non-reporting households). Segment 2 includes households 5 and 6 (reporting households) as well as households 7, 8, and 9 (non-reporting households). Segment 3 includes households 10 and 11 (reporting households) as well as household 12 (non-reporting household).

To further aid in understanding the present disclosure, FIG. 3 illustrates a set of features 300 which conceptually denotes a priority or ordering of the features for use in segmenting households. For instance, the initial features 301, or "level 1" features may include a DMA code, a type of subscription package, an age (e.g., of a head of household), a gender (e.g., of the head of household), a state (e.g., the state where a cellular service is registered, or where a customer premises is located for television, phone, and or Internet service, etc.), a number of children in the household, a number of adults in the household, a spoken language (e.g., a primary language preference indicated by the household, or a secondary language in addition to a primary language in the region), whether the household has a phone service included in its subscription, an access indicator (e.g., an indicator of whether the household has Internet access or not), and a tenure in months (e.g., how long the household has been a customer/subscriber).

In one example, the initial features 301 may be used first to create segments. However, as described above, if a segment does not include at least one reporting household or a minimum/threshold number of reporting households, the criteria for creating segments and/or the criteria for inclusion within a segment lacking a sufficient number of reporting households may be broadened. In particular, the feature values for certain features may be excluded from the criteria for segment inclusion (e.g., "layered segmentation"). In one example, the features can be dropped based on ranking of importance. For instance, the importance can be independently estimated from linear regression models or through a subject matter expert. To illustrate, level 2 features 302 may drop the features of "spoken language," "phone service," and "access indicator." Thus, if a segment created in accordance with the initial features 301 does not include a sufficient number of reporting households, the segment may be recomputed in accordance with feature values for the level 2 features 302. In other words, households in the segment need only match the same feature values for the remaining features in the level 2 features 302.

Similarly, if one or more segments still do not include sufficient numbers of reporting households after one or more segments are re-computed in accordance with the level 2 features 302, then one or more segments may again be recomputed using a further reduced set of features, such as default (level 3) features 303. In other words, households in a segment that is recomputed need only match the same feature values for the remaining features in the default (level 3) features 303. The features and/or feature values for such features may be removed in stages, where each stage may remove one or more features and/or feature values.

It should be noted that in various examples, more or less initial features may be utilized for segmentation, more or less features may be dropped from one level/iteration to the next, more or less levels/iterations may be utilized, and so forth. It should also be noted that when at least one segment does not include a sufficient number of reporting households, the re-computing using feature values for level 2 and subsequent level features may be for only those segments having an insufficient number of reporting households, or may be applied to all households anew.

Figure 4:
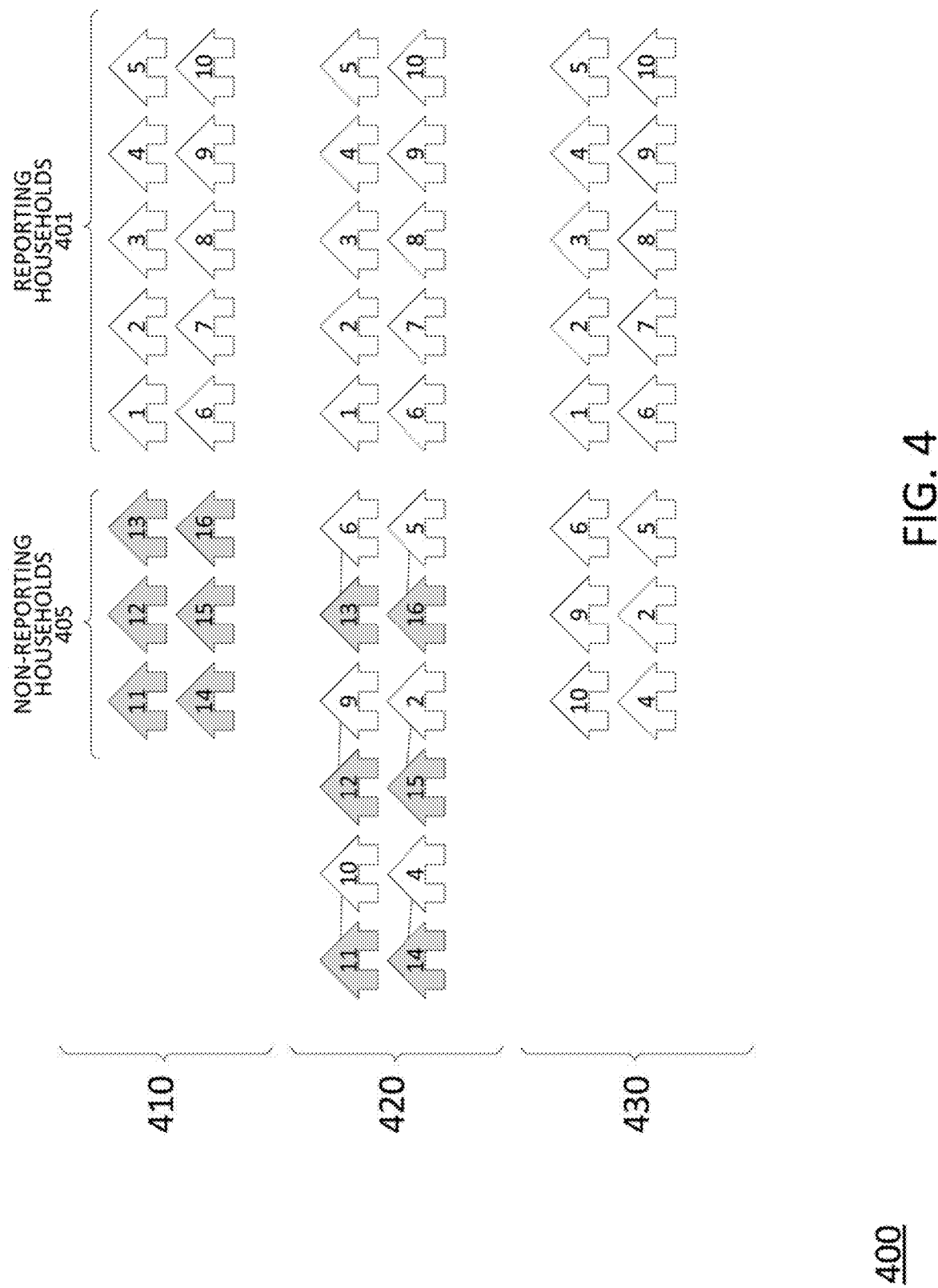
FIG. 4 illustrates an example process of linking non-reporting households to reporting households within a segment when there are more reporting households than non-reporting households, in accordance with the present disclosure.

To further aid in understanding the present disclosure, FIG. 4 illustrates an example process 400 of linking non-reporting households to reporting households within a segment when there are more reporting households than non-reporting households. In one example, the process 400 may be performed by a processing system, e.g., one or more devices illustrated in FIG. 1, such as application server 135, or application server 135 in conjunction with one or more of the servers 136, devices in core network 150, access network 110 and/or access network 120, and so forth. As shown in FIG. 4 at an initial stage 410, there are 16 households in a segment including reporting households 401 (e.g., households 1-10) and non-reporting households 405 (e.g., households 11-16). The households 1-16 may all be in the same segment based upon having the same feature values for a plurality of features (e.g., initial features of a set of features used by the processing system for segmentation).

At stage 420, the processing system may link each of the non-reporting households 405 (households 11-16) to a respective one of the reporting households 401 (households 1-10). In particular, the processing system may randomly select one of the reporting households 401 for each of the non-reporting households 405 (households 11-16). In one example, the processing system may start with non-reporting household 11 and may select reporting household 10 to link to non-reporting household 11. After the selection and linkage, reporting household 10 may be excluded from further selection for linkage to others of the non-reporting households 405. Thus, processing system may next address non-reporting household 12. In the present example, and as illustrated in FIG. 4, the processing system may randomly select reporting household 9 from among the remaining available reporting households (households 1-9). Thus, household 9 is excluded from further selection as the processing system continues to address additional non-reporting households. For instance, the processing system may randomly select reporting household 6 from among the remaining available reporting households (households 1-8) to link to non-reporting household 13. Next, the processing system may randomly select reporting household 4 from among the remaining available reporting households 1-5, 7, and 8) to link to non-reporting household 14, and so on until all of the non-reporting households 405 have been linked to a respective one of the reporting households 401.

Notably, if information regarding features of interest (e.g., television "viewership information") is desired for the entire segment, the information may be computed as the sum over the reporting households and linked non-reporting households. For instance, stage 430 illustrates that the segment may be represented as follows: reporting households are represented directly with the information value(s) available, while non-reporting households are represented by the information value(s) taken from the respective linked reporting households for which the information was not available for the non-reporting households.

Figure 5:
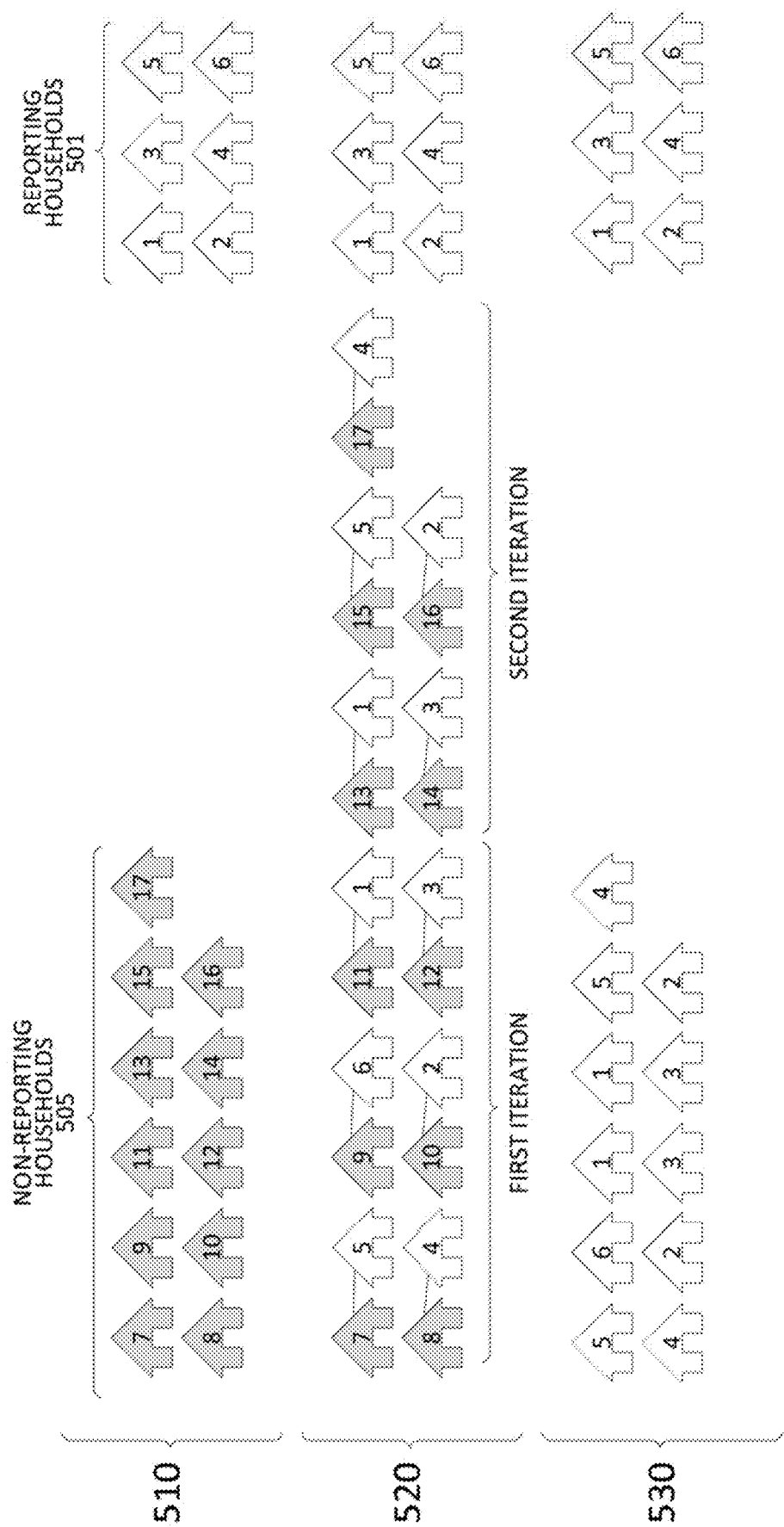
FIG. 5 illustrates an example process of linking non-reporting households to reporting households within a segment when there are less reporting households than non-reporting households, in accordance with the present disclosure.

To further aid in understanding the present disclosure, FIG. 5 illustrates an example process 500 of linking non-reporting households to reporting households within a segment when there are less reporting households than non-reporting households. In one example, the process 500 may be performed by a processing system, e.g., one or more devices illustrated in FIG. 1, such as application server 135, or application server 135 in conjunction with one or more of the servers 136, devices in core network 150, access network 110 and/or access network 120, and so forth. As shown in FIG. 5 at an initial stage 510, there are 17 households in a segment including reporting households 501 (e.g., households 1-6) and non-reporting households 505 (e.g., households 7-17). The households 1-17 may all be in the same segment based upon having the same feature values for a plurality of features (e.g., initial features of a set of features used by the processing system for segmentation).

At stage 520, the processing system may link each of the non-reporting households 505 (households 7-17) to a respective one of the reporting households 501 (households 1-6). However, unlike the example of FIG. 4, stage 520 may include multiple iterations or cycles, where reporting households 1-6 may not be re-selected for linking to a second non-reporting household within an iteration, but may be made available again, and may be re-selected for linking to a second or subsequent non-reporting household within a next iteration (and for each subsequent iteration).

To illustrate, since there are six reporting households, each iteration may include at most six selections and linkages between non-reporting and reporting households. In the present example and as illustrated in FIG. 5, in the first iteration the processing system may randomly select reporting household 5 to link with non-reporting household 7, reporting household 4 with non-reporting household 8, reporting household 6 with non-reporting household 9, reporting household 2 with non-reporting household 10, reporting household 1 with non-reporting household 11, and reporting household 3 with non-reporting household 12. For each reporting household selected, the reporting household is made unavailable for further selection within the first iteration. However, when all of the reporting households 501 have been selected, a second iteration may begin where all of the reporting households 501 are again made available for selection for remaining non-reporting households that have not yet been linked to a reporting household (e.g., households 13-17). An example of how reporting households may be selected and linked with the remaining non-reporting households 13-17 is illustrated in the figure. Again, each time a reporting household is selected to link to one of the non-reporting households 13-17, the reporting household may be made unavailable for further selection within the iteration. In the example of FIG. 5, each of the non-reporting households 505 is assigned a respective one of the reporting households 501 before the end of the second iteration (e.g., before all of the reporting households 501 have been selected for a second time). Thus, the process 500 does not include a third iteration and stage 520 may end.

Notably, if information regarding features of interest (e.g., television "viewership information") is desired for the entire segment, the information may be computed as the sum over the reporting households and linked non-reporting households. For instance, stage 530 illustrates that the segment may be represented as follows: reporting households are represented directly with the information value(s) available, while non-reporting households are represented by the information value(s) taken from the respective linked reporting households for which the information was not available for the non-reporting households.

It should also be noted with regard to the examples of both FIGS. 4 and 5 that although aggregate information regarding a segment may be determined as described above, in other examples, aggregate information regarding different groupings of households may still be determined in accordance with the linkages between non-reporting and reporting households. For instance, households may be segmented using a first set of features as criteria for segmentation. In addition, a respective reporting household may be linked to each non-reporting household within each segment. However, the processing system or another entity, such as a network technician, a marketing or advertising entity, or another automated system within a telecommunication network may be interested in aggregate information for one or more other groups of households, e.g., where the households are grouped using a different set of features. In each case, an information value for a feature of interest for a non-reporting household may be taken as the information value for the feature of interest copied from the linked reporting household.

Figure 6:
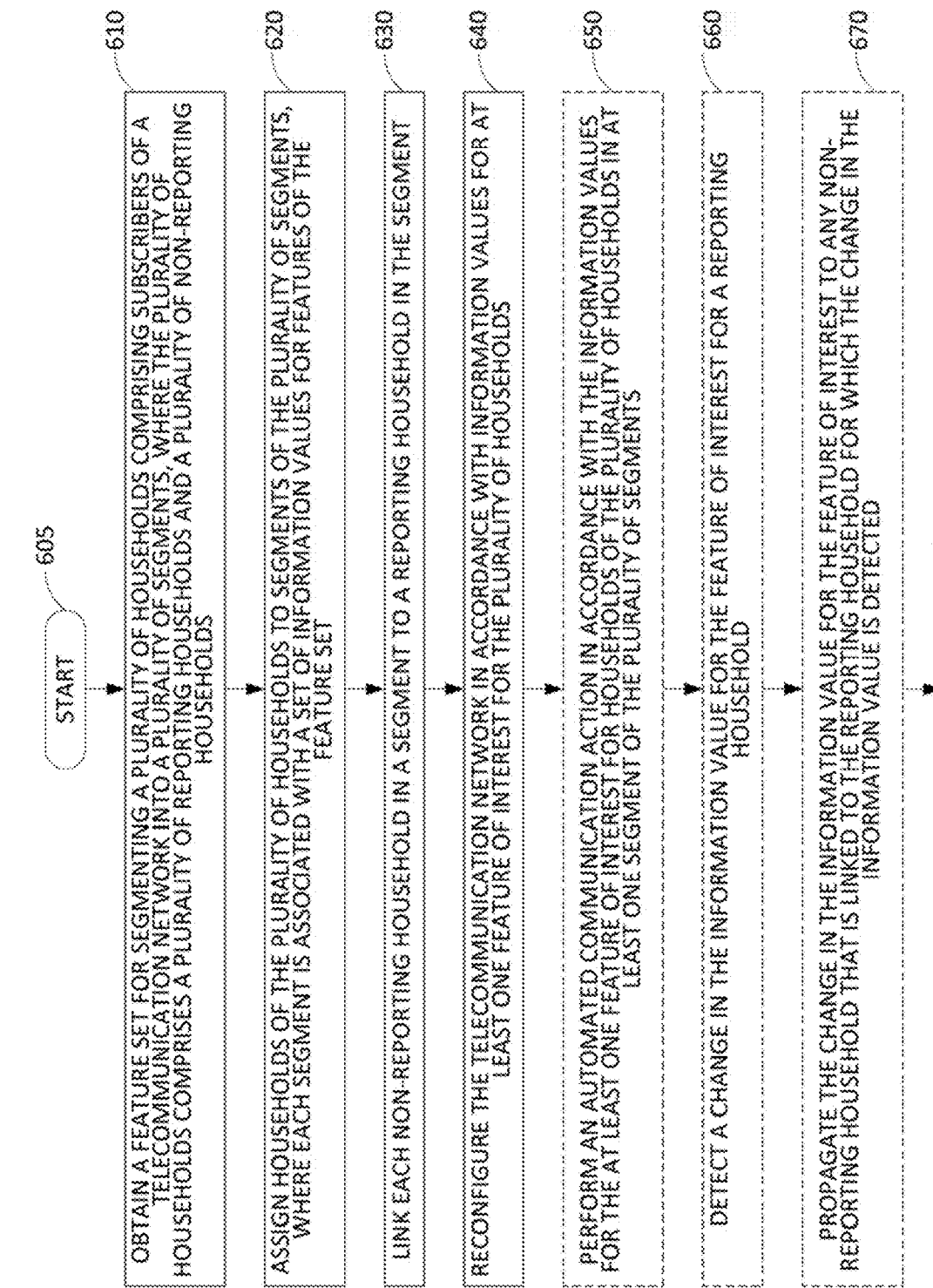
FIG. 6 illustrates a flowchart of an example method for configuring a telecommunication network via feature-based segmentation and linking of non-reporting and reporting subscriber households.

FIG. 6 illustrates a flowchart of an example method 600 for configuring a telecommunication network via feature-based segmentation and linking of non-reporting and reporting subscriber households. In one example, the steps, operations, or functions of the method 600 may be performed by any one or more of the components of the system 100 depicted in FIG. 1. For instance, in one example, the method 600 is performed by the application server 135, or by application server 135 in conjunction with other components of the system 100. In one example, the steps, functions, or operations of method 600 may be performed by a computing device or system 700, and/or processor 702 as described in connection with FIG. 7 below. For instance, the computing device or system 700 may represent any one or more components of the system 100 of FIG. 1 that is/are configured to perform the steps, functions and/or operations of the method 600. Similarly, in one example, the steps, functions, or operations of method 600 may be performed by a processing system comprising one or more computing devices collectively configured to perform various steps, functions, and/or operations of the method 600. For instance, multiple instances of the computing device or processing system 700 may collectively function as a processing system. For illustrative purposes, the method 600 is described in greater detail below in connection with an example performed by a processing system.

The method 600 begins at step 605 and proceeds to step 610. At step 610, the processing system obtains a feature set for segmenting a plurality of households comprising subscribers of a telecommunication network into a plurality of segments. The plurality of households may comprise a plurality of reporting households and a plurality of non-reporting households. The plurality of reporting households comprises households of the plurality of households for which an information value regarding at least one feature of interest is available to the processing system, whereas the plurality of non-reporting households comprises households of the plurality of households for which an information value regarding the at least one feature of interest is not available to the processing system.

The feature set may include any one or more of: demographic features, television service features, telephone service features, or internet service features. For example, television service features may include: duration of viewing, channels watched, the times the channels are watched, video programs that are recorded to a digital video recorder (DVR), video programs that are ordered for video on demand (VoD), television subscription information, e.g., length of contract, package subscribed to, channel lineup, premium channels and/or international channels subscribed to, a number of set-top boxes and/or a number of televisions at a subscriber premises, and so on. Demographic features (or household demographic features) may include a family size, a level of technology adoption, a level of subscription to premium services, a level of video consumption, a level of social network consumption, a vehicle category, a number of vehicles per household, etc. Telephone service features may include a number of handsets, a long distance service subscription, and so on. Telephone service features may also include cellular service features, such as a make and model of a mobile phone, a number of mobile phones, a subscription plan, a data package (e.g., a monthly allotment of pre-paid data), a number of calls made and/or received, a number of text messages sent and/or received, and so forth. Internet service features may include a router type, upload and/or download speed/bandwidth(s) according to a subscription, an average number of connected devices, a volume of data usage (e.g., weekly, monthly, etc.), and so forth.

In one example, the plurality of non-reporting households may include households of the plurality of households that are opted-out of recordation of information values for the at least one feature of interest. Alternatively, or in addition, with regard to television service features, the plurality of non-reporting households may comprise subscribers having set-top boxes that are not equipped to report usage information back to the processing system. In one example, the feature set is obtained with the features of the feature set in an order of priority. In one example, the order of priority may also group features in stages comprising one or more of the information values per stage. For example, the feature set (including order of priority) and the at least one feature of interest may be obtained from a client processing system, such as from an client device of an advertiser or marketing entity, from a device of telecommunication network personnel, and so forth. For instance, a data investigator may define the importance of the variables (features) before the start of a study. In other words, if the purpose of segmentation and linking of reporting and non-reporting households is for a particular subject area, advertisers or other interested entities may prioritize certain attributes/features.

At step 620, the processing system assigns households of the plurality of households to segments of the plurality of segments. As described above, each segment is associated with a set of information values for features of the feature set, where for each segment, households assigned to the segment have information values that are the same for each of the features of the feature set. In one example, step 620 includes determining whether there is at least one reporting household in a segment, and in response to determining that there is not at least one reporting household in the segment, removing at least one information value of the set of information values associated with the segment from the set of information values associated with the segment. In one example, the removing the at least one information value comprises removing information values for a number of features of the feature set until at least one reporting household is in the segment. For instance, at step 610 the feature set may be obtained with the features of the feature set in an order of priority. In such an example, the removing of the information values for the number of features may include removing the information values for the number of features according to the order of priority. In addition, in one example, the information values for the number of features may be for removal in stages comprising one or more of the information values per stage. Thus, in one example, the removing is stopped at a stage when at least one reporting household (or other threshold/minimum numbers of reporting households) is in the segment. In one example, the processing system may also suggest or may automatically de-prioritize certain features/attributes which may be determined to show little variation from one category to another, e.g., one type of viewership data from reporting households may be fairly steady from segment to segment. Thus, this feature may be considered less important and can be one of the first to be dropped since it is less distinguishing than other features.

At step 630, the processing system links each non-reporting household in a segment to a reporting household in the segment. For instance, in one example, step 630 may include, for each non-reporting household of the segment, selecting a reporting household from the at least one reporting household in the segment to link to the non-reporting household. In one example, when the reporting household is linked to the non-reporting household, the reporting household is made unavailable for selection to link to another non-reporting household in the segment until all reporting households in the segment have been selected to link to a respective non-reporting household in the segment. Step 630 may also include (for each non-reporting household) assigning an information value for the at least one feature of interest from the respective linked reporting household to the non-reporting household.

At step 640, the processing system reconfigures the telecommunication network in accordance with information values for the at least one feature of interest for the plurality of households. For example step 640 may include identifying a utilization trend in the telecommunication network comprising an increased usage or a decreased usage of at least one service provided by the telecommunication network, and allocating at least one additional resource of the telecommunication network to the at least one service or removing at least one existing resource of the telecommunication network that is allocated to the at least one service in accordance with the utilization trend. In one example, the at least one additional resource or the at least one existing resource may comprise at least one of: a hardware computing resource, or a non-hardware resource that is provided via at least one hardware computing resource. For instance, a hardware computing resource can be additional content servers, additional switches and routers, additional links in the network that are made active, etc. A hardware computing resource can also include remote radio heads (RRHs) and baseband units (BBUs), picocells and/or femtocells that can be remotely activated and deactivated, and so on.

Alternatively, or in addition, the at least one additional resource or the at least one existing resource may comprise a virtual machine or a container hosted on a network function virtualization infrastructure, or a bandwidth allocation on at least one network link in the telecommunication network. In one example, when the service comprises a television service, and when the utilization trend comprises an increased viewership of a video program beyond a threshold viewership, the at least one additional resource that is allocated to the service may comprise storage capacity for at least one additional copy of the video program at an edge server of the telecommunication network. For instance, the processing system may provide more copies closer to end users so as to not inundate another edge server that may be further away from a number of users and/or which may become overloaded.

At optional step 650, the processing system may perform an automated communication action in accordance with the information values for the at least one feature of interest for households of the plurality of households in at least one segment of the plurality of segments. For example, the automated communication action may be triggered when it is determined that more than a threshold number of households in a segment include a particular information value for the at least one feature of interest. In one example, the automated communication action may be activating a marketing automation platform to direct automated communications to one or more devices of one or more of the plurality of households in the at least one segment. For instance, the marketing automation platform can direct advertisements at the households of the segment, e.g., if more than a threshold number of households in the segment include a particular information value for the at least one feature of interest. The automated communication action can include presenting advertisements during television viewing, sending emails to email address(es) associated with the household(s) account(s), and so forth.

At optional step 660, the processing system may detect a change in the information value for the feature of interest for a reporting household. For instance, as described above, the processing system may be associated with a telecommunication network and may gather, have access to, or otherwise obtain information values for various households. Thus, the processing system may also detect changes in such values for reporting households.

At optional step 670, the processing system may propagate the change in the information value(s) for the at least one feature of interest to any non-reporting household that is linked to the reporting household for which the change in the information value is detected. For instance, the processing system may maintain a link file recording linked reporting and non-reporting households, which can be used to extrapolate any metric for a given period of time (e.g., a duration of a marketing campaign, an investigational study, etc.). In one example, the processing system may continue to reconfigure the telecommunication network, perform automated communication actions, and so forth in response to the information values for the at least one feature of interest for one or more segments. As such, the processing system may continue to update information values for non-reporting households to provide an estimate over all households in a segment (and across segments, depending upon the particular use case). Notably, a reporting household does not need to be re-linked to a non-reporting household. Rather, a link may persist for as long as the processing system may be configured to maintain the link, and the information value(s) for the at least one feature of interest may continue to be mirrored for the non-reporting household linked to the reporting household.

Following step 640, or any of the optional steps 650-670, the method 600 may proceed to step 695 where the method 600 ends.

It should be noted that the method 600 may be expanded to include additional steps, or may be modified to replace steps with different steps, to combine steps, to omit steps, to perform steps in a different order, and so forth. For example, the method 600 may be altered to comprise repeating steps 640 to 670. Similarly, the method 600 may continue to be repeated, e.g., with respect to additional feature sets and features of interest (e.g., from other advertisers, network operations personnel, television content providers, or other clients). In one example, step 620 may include removing at least one information value of the set of information values associated with a segment from the set of information values associated with the segment when it is determined that there is not at least one reporting household in the segment (e.g., performing such operations only for the segment lacking a sufficient number of reporting households). However, in another example, step 620 may include dropping features and/or information values for such features across a plurality of the segments and/or for all segments. For example, all segments may be recalculated in accordance with the reduced feature set.

In one example, where step 620 may include recalculating for a given segment (and not across all segments) the processing system may exclude a reporting household from the segment after the recalculation of the segment with fewer information values and/or features, since this reporting household is presumably in another segment. However, the reporting household may first be made available for assignment/linking to a non-reporting household of the segment. Alternatively, or in addition, the processing system at step 640 may disregard the segment boundaries. For instance, it is possible that a reporting household ends up in more than one segment (since an updated segment has broader inclusion criteria, and the reporting household may already be included in another segment with more selective inclusion criteria). However, for network optimization, each household may only be counted once for one or more metrics, so it is of no consequence that a reporting household ends up in more than one segment.

In addition, although not specifically specified, one or more steps, functions or operations of the method 600 may include a storing, displaying and/or outputting step as required for a particular application. In other words, any data, records, fields, and/or intermediate results discussed in the method 600 can be stored, displayed and/or outputted either on the device executing the method 600, or to another device, as required for a particular application. Furthermore, steps, blocks, functions, or operations in FIG. 6 that recite a determining operation or involve a decision do not necessarily require that both branches of the determining operation be practiced. In other words, one of the branches of the determining operation can be deemed as an optional step. In addition, one or more steps, blocks, functions, or operations of the above described method 600 may comprise optional steps, or can be combined, separated, and/or performed in a different order from that described above, without departing from the examples of the present disclosure.

FIG. 7 depicts a high-level block diagram of a computing device specifically programmed to perform the functions described herein. As depicted in FIG. 7, the system 700 comprises one or more hardware processor elements 702 (e.g., a central processing unit (CPU), a microprocessor, or a multi-core processor), a memory 704 (e.g., random access memory (RAM) and/or read only memory (ROM)), a module 705 for configuring a telecommunication network via feature-based segmentation and linking of non-reporting and reporting subscriber households, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 600 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 702 can also be configured or programmed to cause other devices to perform one or more operations as discussed above. In other words, the one or more hardware processors 702 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one example, instructions and data for the present module or process 705 for configuring a telecommunication network via feature-based segmentation and linking of non-reporting and reporting subscriber households (e.g., a software program comprising computer-executable instructions) can be loaded into memory 704 and executed by hardware processor element 702 to implement the steps, functions or operations as discussed above in connection with the illustrative method 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 705 for configuring a telecommunication network via feature-based segmentation and linking of non-reporting and reporting subscriber households (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising: obtaining, by a processing system including at least one processor, a feature set for segmenting a plurality of households comprising subscribers of a telecommunication network into a plurality of segments, wherein the plurality of households comprises a plurality of reporting households and a plurality of non-reporting households, wherein the plurality of reporting households comprises households of the plurality of households for which an information value regarding at least one feature of interest is available to the processing system, and wherein the plurality of non-reporting households comprises households of the plurality of households for which an information value regarding the at least one feature of interest is not available to the processing system;

assigning, by the processing system, households of the plurality of households to segments of the plurality of segments, wherein each segment is associated with a set of information values for features of the feature set, and wherein for each segment, households assigned to a respective segment have information values that are the same for each of the features of the feature set;

linking, by the processing system, each non-reporting household of the plurality of non-reporting households in a segment to a reporting household in the segment, wherein the linking comprises, for each non-reporting household in the segment:

selecting the reporting household in the segment to be linked to the non-reporting household, wherein the reporting household is then made unavailable for selection to link to another non-reporting household in the segment until all reporting households in the segment have been selected to link to a respective non-reporting household in the segment;

and assigning an information value for the at least one feature of interest from the reporting household to the non-reporting household;

and reconfiguring, by the processing system, the telecommunication network in accordance with information values for the at least one feature of interest for the plurality of households, wherein the reconfiguring the telecommunication network in accordance with the information values for the at least one feature of interest for the plurality of households comprises:

identifying a utilization trend in the telecommunication network comprising an increased usage or a decreased usage of at least one service provided by the telecommunication network, wherein the information values comprise the increased usage or the decreased usage;

and allocating at least one additional resource of the telecommunication network to the at least one service or removing at least one existing resource of the telecommunication network that is allocated to the at least one service in accordance with the utilization trend, wherein the at least one additional resource or the at least one existing resource comprises a hardware computing resource.

2. The method of claim 1, wherein the assigning the households of the plurality of households to the segments of the plurality of segments comprises: determining whether there is at least one reporting household in a segment of the plurality of segments; and when there is not at least one reporting household in the segment, removing at least one information value of the set of information values associated with the segment.

3. The method of claim 2, wherein the removing the at least one information value comprises removing information values for a number of features of the features of the feature set until at least one reporting household is in the segment.

4. The method of claim 3, wherein the feature set is obtained with the features of the feature set in an order of priority, wherein the removing the information values for the number of features comprises removing the information values for the number of features according to the order of priority.

5. The method of claim 4, wherein one or more of the information values are removed on a per stage basis of a plurality of stages, and wherein the removing is stopped at a particular stage of the plurality of stages when at least one reporting household is in the segment.

6. The method of claim 1, wherein the feature set comprises demographic features.

7. The method of claim 1, wherein the feature set comprises television service features.

8. The method of claim 1, wherein the feature set comprises telephone service features.

9. The method of claim 1, wherein the feature set comprises internet service features.

10. The method of claim 1, wherein the at least one additional resource or the at least one existing resource further comprises: a virtual machine or a container hosted on a network function virtualization infrastructure.

11. The method of claim 10, wherein the at least one additional resource further comprises a bandwidth allocation on at least one network link in the telecommunication network.

12. The method of claim 1, wherein when the at least one service comprises a television service, and when the utilization trend comprises an increased viewership of a video program beyond a threshold viewership, the at least one additional resource that is allocated to the at least one service comprises storing at least one additional copy of the video program at an edge server of the telecommunication network.

13. The method of claim 1, further comprising: performing an automated communication action in accordance with the information values for the at least one feature of interest for households of the plurality of households in at least one segment of the plurality of segments.

14. The method of claim 13, wherein the automated communication action comprises: activating a marketing automation platform to direct automated communications to one or more devices of one or more of the plurality of households in the at least one segment of the plurality of segments.

15. The method of claim 1, wherein the plurality of non-reporting households comprises households of the plurality of households that are opted-out of recordation of information values for the at least one feature of interest.

16. The method of claim 1, further comprising: detecting a change in the information value for the at least one feature of interest for a reporting household of the plurality of households; and propagating the change in the information value for the at least one feature of interest to any non-reporting household that is linked to the reporting household for which the change in the information value is detected.

17. A non-transitory computer-readable medium storing instructions which, when executed by a processing system including at least one processor, cause the processing system to perform operations, the operations comprising: obtaining a feature set for segmenting a plurality of households comprising subscribers of a telecommunication network into a plurality of segments, wherein the plurality of households comprises a plurality of reporting households and a plurality of non-reporting households, wherein the plurality of reporting households comprises households of the plurality of households for which an information value regarding at least one feature of interest is available to the processing system, and wherein the plurality of non-reporting households comprises households of the plurality of households for which an information value regarding the at least one feature of interest is not available to the processing system; assigning households of the plurality of households to segments of the plurality of segments, wherein each segment is associated with a set of information values for features of the feature set, and wherein for each segment, households assigned to a respective segment have information values that are the same for each of the features of the feature set; linking each non-reporting household of the plurality of non-reporting households in a segment to a reporting household in the segment, wherein the linking comprises, for each non-reporting household in the segment: selecting the reporting household in the segment to be linked to the non-reporting household, wherein the reporting household is then made unavailable for selection to link to another non-reporting household in the segment until all reporting households in the segment have been selected to link to a respective non-reporting household in the segment; and assigning an information value for the at least one feature of interest from the reporting household to the non-reporting household; and reconfiguring the telecommunication network in accordance with information values for the at least one feature of interest for the plurality of households, wherein the reconfiguring the telecommunication network in accordance with the information values for the at least one feature of interest for the plurality of households comprises: identifying a utilization trend in the telecommunication network comprising an increased usage or a decreased usage of at least one service provided by the telecommunication network, wherein the information values comprise the increased usage or the decreased usage; and allocating at least one additional resource of the telecommunication network to the at least one service or removing at least one existing resource of the telecommunication network that is allocated to the at least one service in accordance with the utilization trend, wherein the at least one additional resource or the at least one existing resource comprises a hardware computing resource.

18. An apparatus comprising: a processing system including at least one processor; and a computer-readable medium storing instructions which, when executed by the processing system, cause the processing system to perform operations, the operations comprising: obtaining a feature set for segmenting a plurality of households comprising subscribers of a telecommunication network into a plurality of segments, wherein the plurality of households comprises a plurality of reporting households and a plurality of non-reporting households, wherein the plurality of reporting households comprises households of the plurality of households for which an information value regarding at least one feature of interest is available to the processing system, and wherein the plurality of non-reporting households comprises households of the plurality of households for which an information value regarding the at least one feature of interest is not available to the processing system; assigning households of the plurality of households to segments of the plurality of segments, wherein each segment is associated with a set of information values for features of the feature set, and wherein for each segment, households assigned to a respective segment have information values that are the same for each of the features of the feature set; linking each non-reporting household of the plurality of non-reporting households in a segment to a reporting household in the segment, wherein the linking comprises, for each non-reporting household in the segment: selecting the reporting household in the segment to be linked to the non-reporting household, wherein the reporting household is then made unavailable for selection to link to another non-reporting household in the segment until all reporting households in the segment have been selected to link to a respective non-reporting household in the segment; and assigning an information value for the at least one feature of interest from the reporting household to the non-reporting household; and reconfiguring the telecommunication network in accordance with information values for the at least one feature of interest for the plurality of households, wherein the reconfiguring the telecommunication network in accordance with the information values for the at least one feature of interest for the plurality of households comprises: identifying a utilization trend in the telecommunication network comprising an increased usage or a decreased usage of at least one service provided by the telecommunication network, wherein the information values comprise the increased usage or the decreased usage; and allocating at least one additional resource of the telecommunication network to the at least one service or removing at least one existing resource of the telecommunication network that is allocated to the at least one service in accordance with the utilization trend, wherein the at least one additional resource or the at least one existing resource comprises a hardware computing resource.

19. The apparatus of claim 18, wherein the assigning the households of the plurality of households to the segments of the plurality of segments comprises: determining whether there is at least one reporting household in a segment of the plurality of segments; and when there is not at least one reporting household in the segment, removing at least one information value of the set of information values associated with the segment.

20. The apparatus of claim 19, wherein the removing the at least one information value comprises removing information values for a number of features of the features of the feature set until at least one reporting household is in the segment.

\* \* \* \* \*